(12) United States Patent
Mitsumine et al.

(10) Patent No.: US 8,026,971 B2
(45) Date of Patent: Sep. 27, 2011

(54) VISIBLE AND INFRARED LIGHT IMAGE-TAKING OPTICAL SYSTEM

(75) Inventors: Hideki Mitsumine, Tokyo (JP);
Shinkichi Ikeda, Saitama (JP);
Syunichiro Ouchi, Saitama (JP);
Arihiro Saita, Saitama (JP)

(73) Assignees: Nippon Hoso Kyokai, Tokyo (JP);
Fujinon Corporation, Saitama-shi (JP)

( * ) Notice: Subject to any disclaimer, the term of this patent is extended or adjusted under 35 U.S.C. 154(b) by 284 days.

(21) Appl. No.: 11/798,885

(22) Filed: May 17, 2007

(65) Prior Publication Data
US 2007/0279514 A1    Dec. 6, 2007

(30) Foreign Application Priority Data

May 18, 2006  (JP) ................... 2006-138804
Apr. 19, 2007  (JP) ................... 2007-110737

(51) Int. Cl.
*H04N 9/07* (2006.01)
*H04N 5/225* (2006.01)
*G03B 13/02* (2006.01)
*G03B 13/08* (2006.01)

(52) U.S. Cl. ......... 348/336; 348/335; 396/384; 396/385

(58) Field of Classification Search .......... 348/335–339; 396/382–386
See application file for complete search history.

(56) References Cited

U.S. PATENT DOCUMENTS

| 4,695,787 | A | * | 9/1987 | Billet et al. | 324/557 |
| 5,910,816 | A | * | 6/1999 | Fontenot et al. | 348/65 |
| 2001/0021011 | A1 | * | 9/2001 | Ono | 356/3 |
| 2003/0173518 | A1 | * | 9/2003 | Ozaki | 250/330 |
| 2004/0196371 | A1 | * | 10/2004 | Kono et al. | 348/162 |
| 2004/0208395 | A1 | * | 10/2004 | Nomura | 382/275 |
| 2005/0012843 | A1 | * | 1/2005 | Kuwakino et al. | 348/335 |

FOREIGN PATENT DOCUMENTS

| EP | 1487199 A1 | 12/2004 |
| JP | 2004-45266 A | 2/2004 |
| JP | 2005-4181 A | 1/2005 |

* cited by examiner

*Primary Examiner* — Nhan T Tran
*Assistant Examiner* — Tuan Le
(74) *Attorney, Agent, or Firm* — Birch, Stewart, Kolasch & Birch, LLP

(57) ABSTRACT

The present invention provides a visible and infrared light image-taking optical system which can facilitate changing a wavelength of infrared light used to take an infrared video image with an infrared light camera and which can achieve an infrared video image not affected by infrared light of any wavelength other than a desired wavelength, by separating object light incident on an image-taking optical system into object light in a visible light region and object light in an infrared light region and taking an object image formed by each object light for each object light in each wavelength region decomposed by the color separation optical system.

5 Claims, 4 Drawing Sheets

VISIBLE AND INFRARED LIGHT IMAGE-TAKING OPTICAL SYSTEM

BACKGROUND OF THE INVENTION

1. Field of the Invention

The present invention relates to a visible and infrared light image-taking optical system, and more particularly, to a visible and infrared light image-taking optical system which enables the same object to be taken simultaneously using visible light and infrared light.

2. Description of the Related Art

Japanese Patent Application Laid-Open No. 2005-4181 and No. 2004-45266 have proposed a lens system which takes the same object image using visible light and infrared light through a lens device used in a TV camera for broadcasting or for business use. These lens systems permit object light incident on an image-taking lens to be separated into object light in a visible light region and object light in an infrared light region by a color separation prism, so that an image by the each object light is formed at a visible light image pickup element and an infrared light image pickup element, respectively. The lens system according to Patent Unexamined Patent Application Publication No. 2005-4181 includes a correction lens for correcting an image formation position of object light in an infrared light region and adjusting a position of the correction lens corrects axial chromatic aberrations of infrared light.

As one of video image synthesis methods used for synthesis of a live-action video image and a video image prepared by a computer or the like, the chromakey method which replaces a video image in a specific color region of a taken video image with another video image is generally used. In synthesizing video images using the chromakey method, for example, for production of a program for broadcasting, a screen of a mono color such as blue or green is disposed at a background portion of an object such as a performer (a main object) to be captured as a video image. An image region of the screen in a taken video image is identified by color and a key signal for distinguishing a main-object region from a background region is created. A synthesized video image is created by replacing the video image in the background region with another video image created by a computer or the like by use of the key signal.

On the other hand, such a chromakey method requires to keep the screen in a fixed range of brightness, chroma and hue, so that flexibility of setting illumination for the main object is constrained. Moreover, there are some problems such as the constraint that clothes or an accessory of the main object cannot use the same color as a screen of the background.

Accordingly, as a method of video image synthesis for solving such problems, there has been proposed a method for creating a key signal using an infrared video image taken by a camera for infrared light. This permits the screen formed of recursive reflection material having the property of reflecting incident light strongly toward a light source to be disposed at a background portion of the main object. Infrared light is irradiated from the camera for infrared light toward the main object and an infrared light video image is taken by the infrared light camera. At this time, the infrared light is diffused on a surface of the main object and, on the screen of the background, the infrared light is reflected strongly toward the light source, thus achieving an infrared video image with a dark main object and a bright background portion. Detecting a difference (contrast) in the brightness creates a key signal for distinguishing a main-object region from a background region. The infrared light camera is disposed so as to take an infrared video image having the same view angle and the same object distance as a camera (a visible light camera) taking a color video image of visible light, for example, when mounted to a lens device as disclosed in Japanese Patent Application Laid-Open No. 2005-4181. Accordingly, when a key signal is created by an infrared video image of the infrared light camera, the key signal appropriately distinguishes a main-object region of a color video image taken by the visible light camera from a background region. This enables to replace only a video image in the background region of the color video image taken by the visible light camera with another video image.

SUMMARY OF THE INVENTION

However, the video image synthesis method using a infrared video image of an infrared light camera as described above has some problems. In other words, when taking the main object with a plurality of visible light cameras and performing video image synthesis for video images taken by respective visible light cameras, infrared light cameras for creating a key signal for the respective visible light cameras are disposed, and an illumination light source for irradiating infrared light toward the main object is disposed near the infrared light cameras. At this time, the infrared light irradiated from respective illumination light sources increases the reflected light quantity of infrared light on the main subject, so that a difference from the reflected light quantity of infrared light reflected by the screen at the background portion is decreased. Accordingly, a contrast between the main object and the background region becomes insufficient in a video image taken by the infrared light camera, thus there occurs a problem that an appropriate key signal cannot be created.

Moreover, the light serving as illumination for the video image taken by the visible light camera sometimes includes infrared light depending upon an image-taking environment. The effect of the infrared light makes a contrast between a main-object region and a background region in the infrared video image of the infrared light camera insufficient, thus causing a possibility that an appropriate key signal may not be created.

Accordingly, it is supposed that a wavelength of the infrared light used to take an infrared video image with the infrared light camera can be prevented from being overlapped with a wavelength of infrared light used in another infrared light camera or can be made into a wavelength for a favorable infrared video image, by changing the wavelength of the infrared light.

However, the conventional lens system as disclosed in Japanese Patent Application Laid-Open No. 2005-4181 and No. 2004-45266 can change a wavelength of infrared light used to take an infrared video image by changing a wavelength of infrared light emergent from an illumination light source, but cannot eliminate an effect of the infrared light of any wavelength other than the wavelength.

In view of the aforementioned problems, it is an object of the present invention to provide a visible and infrared light image-taking optical system which can facilitate changing a wavelength of infrared light used to take an infrared video image with an infrared light camera and which can achieve an infrared video image not affected by infrared light of any wavelength other than a desired wavelength.

To attain the aforementioned object, according to a first aspect of the present invention, a visible and infrared light image-taking optical system comprises: a color separation optical system for separating object light incident on an image-taking optical system into object light in a visible light region and object light in an infrared light region; a visible light optical system for forming an object image on an image pickup surface of a visible light image-taking device which performs imaging with object light in a visible light region separated by the color separation optical system; and an infrared light optical system for forming an object image on an image pickup surface of an infrared light image-taking device which performs imaging with object light in an infrared light region separated by the color separation optical system, wherein the infrared light optical system includes a color separation optical system which decomposes object light in an infrared light region into object lights in a plurality of different wavelength regions and the infrared light image-taking device includes a plurality of image pickup elements for taking an object image formed by each object light for each object light in each wavelength region decomposed by the color separation optical system.

According to the present invention, object light in an infrared light region from an object is decomposed into object lights in a plurality of different wavelength regions by the color separation optical system and object images with object light in the each wavelength region are taken by the individual image pickup elements. Accordingly, changing an infrared video image made effective of infrared video images obtained by respective image pickup elements changes a wavelength of infrared light used to take an infrared video image. This change needs no physical action, thus promptly and easily making a change to an optimum wavelength. Furthermore, when using infrared light in a desired wavelength region for image pickup, the respective image pickup elements, on which only the infrared light in a predetermined wavelength region is incident, are not affected by infrared light in any other wavelength region.

According to a second aspect of the present invention, there is provided the visible and infrared light image-taking optical system in accordance with the first aspect, wherein each of image pickup surfaces of the plurality of image pickup elements is disposed at an image formation position corresponding to a wavelength of object light for forming an object image on the image pickup surface of the each image pickup element.

Because an image formation position depending on axial chromatic aberrations varies with different wavelength regions, the visible and infrared light image-taking optical system of the present invention is provided so that an image pickup surface of each image pickup element for taking an object image formed by object light with different wavelength regions is disposed at such a position as determined in consideration of the axial chromatic aberrations.

According to the visible and infrared light image-taking optical system of the present invention, it is possible to facilitate changing a wavelength of infrared light used to take an infrared video image with an infrared light camera, and achieve an infrared video image not affected by infrared light of any wavelength other than a desired wavelength.

DETAILED DESCRIPTION OF THE PREFERRED EMBODIMENTS

With reference to the accompanying drawings, description will be given below of preferred embodiments of a visible and infrared light image-taking optical system according to the present invention.

Figure 1:
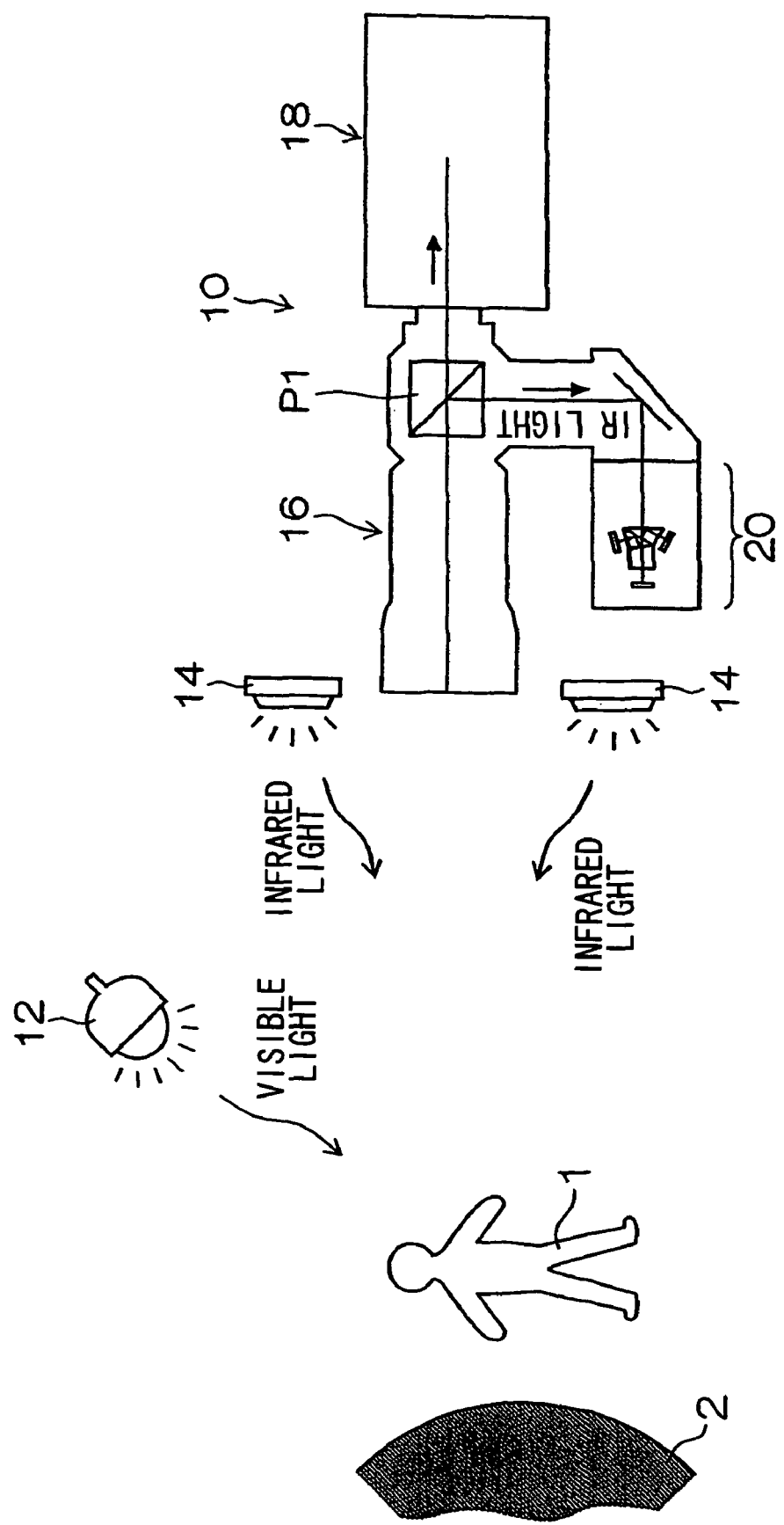
FIG. 1 is a view showing the general configuration of one embodiment of an image-taking system using an image-taking optical system according to the present invention.

FIG. 1 is a view showing the general configuration of one embodiment of an image-taking system using an image-taking optical system according to the present invention. The image-taking system shown in FIG. 1 is an image-taking system for taking a main object video image in producing a program for TV broadcasting, for example, in creating a synthesized video image by synthesizing an image of a main object such as a performer and an image created by a computer or the like as an image of a background portion of the object.

As shown in FIG. 1, ahead of a TV camera 10 having an image-taking optical system according to the present invention, there is a person 1 as a main object. Behind the person, there is disposed a screen 2 constituted of recursive reflection material having properties of strongly reflecting incident light toward a light source.

Above and anterior to the person 1, an illumination light source 12 used for ordinary image-taking with visible light is installed and, from the illumination light source 12, illumination light in a wavelength region (visible light region) of visible light is emitted toward an object. Near the TV camera 10, illumination light sources 14, 14 used for image-taking with infrared light are disposed. From the illumination light sources, 14, illumination light in a wavelength region (infrared light region) of infrared light is emitted toward the object.

The TV camera 10 includes an image-taking lens 16, a visible light camera (body) 18 for image-taking an object with visible light and an infrared light camera (body) 20 for image-taking an object image with infrared light. Visible light and infrared light incident on the person 1 and the screen 2 from the illumination light sources 12, 14 are diffused or reflected on the person 1 or the screen 2 and are incident on an optical system in a camera cone of the image-taking lens 16. As the details will be described below, an optical system of the image-taking lens 16 is arranged with a color separation prism P1, and object light incident on the optical system of the image-taking lens 16 is separated into optical light in a visible light region on a shorter wavelength side than approx. 700 nm and an object light in an infrared light region of approx. 700 to 1,000 nm by the color separation prism P1. The object light in the visible light region is incident on a visible light camera 18 through the color separation prism P1 to form an object image on an image pickup surface of an image pickup element of the visible light camera 18. Thus, a taken video image (a color video image) of an object with visible light is created as a predetermined form of a video signal by a visible light camera 18.

On the other hand, object light in infrared light region is reflected on a reflecting surface of the color separation prism P1 to switch a traveling direction thereof to a roughly right-angled direction and to be incident on the infrared light camera 20, thus forming an object image on an image pickup surface of an image pickup element of an infrared light camera 20. Thus, a pickup image (an infrared video image) of an object with infrared light is created as a predetermined form of video signal by an infrared light camera 20.

A conjugate position relationship exists between the visible light camera 18 and the infrared light camera 20. An optical system of the image-taking lens 16 and optical systems in the visible light camera 18 and the infrared light camera 20 are designed so that a view angle of a color video image taken by the visible light camera 18 and a distance to an object on which the camera comes into focus (an object distance) may almost meet a view angle and an object distance of an infrared video image taken by the infrared light camera 20.

A video editor (not shown) fetches a video signal of a taken video image generated by the visible light camera 18 and a video signal of an infrared video image generated by the infrared light camera 20. Moreover, a key signal for distinguishing a region of the person 1 as a main object from a region of the screen 2 as a background is created on the basis of a contrast of the infrared video image fetched from the infrared light camera 20. On a surface of the screen 2, infrared light from the illumination light sources 14 is reflected in the direction toward the illumination light sources 14 to a degree that infrared light from the illumination light sources 14 is strong by the recursive reflection material, and is incident on the image-taking lens 16 of the TV camera 10 disposed near the illumination light sources 14. On the contrary, on a surface of the person 1 as a main object not provided with special optical treatment such as recursive reflection material, infrared light from the illumination light sources 14 is diffused and reflected on the surface of the person 1, and thus the intensity of infrared light incident on the image-taking lens 16 is hardly strong. Accordingly, a contrast of an infrared video image obtained from the infrared light camera 20 becomes high at a boundary between regions of the person 1 and the screen 2, therefore detecting a portion with high contrast of an infrared video image permits generation of a key signal.

Upon generation of the key signal, a video image in a region of the screen 2 as a background of a taken video image fetched from the visible light camera 18 is replaced with another background video image created in advance by a computer or the like on the basis of the key signal, and a video signal of a synthesized video image is generated, which is created by synthesizing the video image of the person 1 as a main object taken by the visible light camera 18 and the background video image created in advance by a computer or the like.

Figure 2:
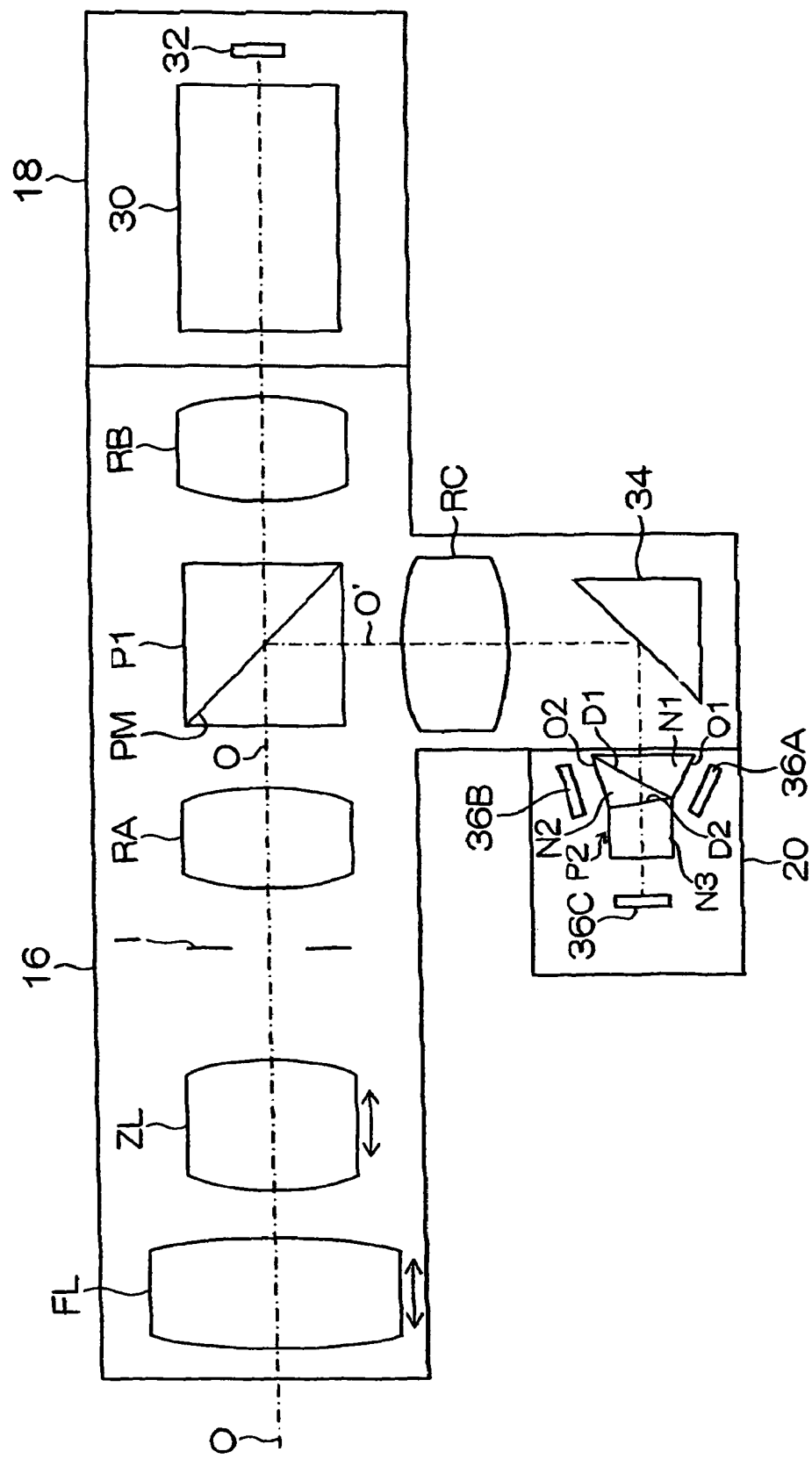
FIG. 2 is a view showing the configuration of an image-taking optical system in TV camera shown in FIG. 1.

FIG. 2 is a view showing the configuration of an image-taking optical system in the TV camera 10. As shown in FIG. 2, the image-taking optical system includes: an optical system disposed in a camera cone of the image-taking lens 16; an optical system disposed in the visible light camera 18 detachably fitted on the camera cone; and an optical system disposed in the infrared light camera 20 detachably fitted on the camera cone. The image-taking optical system constituted of these optical systems is formed with a visible light optical path through which an object light in a visible light region passes and a infrared light optical path through which an object light in an infrared light region passes.

Components of an optical system constituting the visible light optical path, hereinafter referred to as a "visible light optical system", first, will be described below. An optical system of the image-taking lens 16, one of the components of the visible light optical system, is arranged with a focus lens (focus lenses) FL, a zoom lens (zoom lenses) ZL and an iris (an iris mechanism) I in this order from a objective side along an optical axis O, as well as a front-side relay lens (relay lenses) RA and a rear-side relay lens (relay lenses) RB. A color separation prism P1 is disposed between the front-side relay lens RA and the rear-side relay lens RB. At the rear stage of the rear-side relay lens RB, an optical system of the visible light camera 18 is disposed, which is so structured as to have a color separation optical system 30 with a simple configuration and an image pickup element for visible light 32 such as CCD.

The focus lens FL is moved fore and aft in the optical-axis O direction by a motor (not shown) or a manual force, and changing a position of the focus lens FL allows focus adjustment of the visible light optical system. In other words, when a position of the focus lens FL changes, an image formation action of the visible light optical system on the object light in the visible light region changes a distance (an object distance) to an object position (an object surface conjugate with an image pickup surface) at which the image pickup surface of the visible light image pickup element 32 can be focused on the object.

The zoom lens ZL is moved fore and aft in the optical-axis O direction by a motor (not shown) or a manual force, and changing a position of the zoom lens ZL allows zoom adjustment (focal length adjustment) of the visible light optical system. In other words, when a position of the zoom lens ZL changes, a view angle of a video image taken by the visible light image pickup element 32 changes.

The iris I is opened and closed by a motor (not shown) or a manual force. Changing the aperture of the iris I permits iris adjustment (image brightness adjustment) of the visible light optical system.

The relay optical system including the front-side relay lens RA and the rear-side relay lens RB finally images object light in a visible light region on an image pickup surface of the image pickup element 32.

The color separation prism P1 separates incident object light into object light in a visible light region and object light in an infrared light region on a mirror surface, passes through the object light in the visible light region and reflects the object light in the infrared light region. Object light in a visible light region on a shorter wavelength side, for example, than approx. 700 nm passes through the color separation prism P1 with a transmittance of around 90%, while object light in an infrared light region on a longer wavelength side than approx. 700 nm is reflected on the color separation prism P1 with a reflectivity exceeding around 90%. Accordingly, object light in a visible light region travels in an optical-axis O direction as it is, while object light in an infrared light region travels in an optical-axis O' direction at right angles to the optical axis O. The object light incident on the image-taking lens 16 may be separated into object light for visible light image-taking and object light for infrared light image-taking, using a dichroic mirror or the like in place of the color separation prism P1.

The color separation optical system 30 of the visible light camera 18 is, for example, a color separation prism, which permits incident object light in a visible light region to be separated into object lights in wavelength regions of respective colors R, G and B.

The image pickup element 32 of the visible light camera 18 is indicated as one image pickup element on the figure, however, is actually provided for each object light in wavelength regions of respective colors separated by the color separation optical system 30. Where object light incident on the color separation optical system 30 is separated into object lights in wavelength regions of R, G and B as described above, there are provided three image pickup elements for R, G and B at positions on which each object light is incident.

The visible light optical system configured as described above permits object light in a visible light region, of object light incident on an optical system of the image-taking lens 16, to pass through the focus lens FL, the zoom lens FL, the iris I, the front-side relay lens RA, the color separation prism P1, the rear-side relay lens RB and the color separation optical system 30 in this order, thus forming an object image on an image pickup surface of the image pickup element 32. An object image formed on an image pickup surface of the image pickup element 32 is converted into an electric signal by the image pickup element 32 and then undergoes various types of signal processing by a signal processing circuit mounted on the visible light camera 18 to permit the visible light camera 18 to generate a predetermined form of video signal indicating a color video image of an object image.

Next, components of an optical system constituting an infrared light optical path, hereinafter referred to as a "infrared light optical system" will be described below. As components of the infrared light optical system, the focus lens FL, zoom lens ZL, iris I, front-side relay lens RA and color separation prism P1 in the optical system of the image-taking lens 16 are used in common to the components of the visible light optical path described above. At the rear stage from the color separation prism P1, relay lens (relay lenses) RC and a total reflection mirror 34 are arranged along an optical-axis O' branched in a direction almost orthogonal to the optical axis O. At the rear stage of the total reflection mirror 34, an optical system of the infrared light camera 20 is disposed and the optical system is arranged with a color separation prism P2 and three image pickup elements 36A, 36B, 36C.

In the infrared light optical system as well, when a position of the focus lens FL or the zoom lens ZL changes, an object distance and a view angle (a focal length) change like the visual light optical system. When an aperture of the iris I changes, the brightness of an image changes as in the visible light optical system.

The color separation prism P1 reflects only object light in an infrared light region among object light incident as described above on a mirror surface PM to travel object light in an infrared light region in the optical-axis O' direction.

The relay lens RC works on object light in an infrared light region like the rear-side relay lens RB of the visible light optical system, and a relay optical system for object light in an infrared light region is constituted of the front-side relay lens RA and the relay lens RC. This enables object light in the infrared light region to finally form an image on image pickup surfaces of the image pickup elements 36A, 36B, 36C.

The total reflection mirror 34 totally reflects incident object light in an infrared light region and changes a traveling direction of object light by around 90 degrees. However, the total reflection mirror 34 is not always needed.

The color separation prism P2 of the infrared light camera 20 separates incident object light in an infrared light region into object lights in three wavelength regions and is constituted of a first prism N1, a second prism N2 and a third prism N3. On boundary surfaces between the first prism N1 and the second prism N2 and between the second prism N2 and the third prism N3, there are formed dichroic membranes D1, D2 for totally reflecting only light in specific wavelength regions, respectively.

For object light in an infrared light region incident on the first prism N1, the dichroic membrane D1 at the boundary surface between the first prism N1 and the second prism N2 reflects only object light in part of the wavelength regions and causes the reflected object light to be emergent from an emergency surface 01 of the first prism N1. Object light in a wavelength region, for example, around a wavelength of 750 nm is reflected by the dichroic membrane D1 and is made emergent from the emergency surface 01 of the first prism N1.

After object light in a wavelength region passes through the dichroic membrane D1, only object light in part of wavelength regions is reflected by the dichroic membrane D2 at the boundary surface between the second prism N2 and the third prism N3. The reflected object light is made emergent from an emergency surface 02 of the second prism N2.

Object light in a wavelength region, for example, around a wavelength of 850 nm is reflected by the dichroic membrane D2 and is made emergent from the emergency surface 02 of the second prism N2.

Object light in a wavelength region passing through the dichroic membrane D2 is made emergent from an emergency surface 03 of the third prism N3. A wavelength region of object light emergent from the emergency surface 03 is a wavelength region of object light passing through the dichroic membranes D1, D2 among object light reflected by the color separation prism P1. Object light in a wavelength region, for example, around a wavelength of 950 nm is made emergent from the emergency surface 03 of the third prism N3.

This allows object light in an infrared light region incident on the color separation prism P2 to be separated into object lights in three wavelength regions (for example, 750, 850, 950 nm as described above).

The image pickup elements 36A, 36B, 36C are provided for each object light in each wavelength region separated by the color separation prism P2 and is mounted such positions as to meet emergency surfaces 01, 02, 03 of the first prism N1, the second prism N2 and the third prism N3.

According to the infrared light optical system configured above, object light in an infrared light region of the entire object light incident on the optical system of the image-taking lens 16 passes through the focus lens FL, the zoom lens ZL, the iris I and the front-side relay lens RA in this order, is made incident on the color separation prism P1 and is reflected on the color separation prism P1. The object light in the infrared light region passes through the relay lens RC on the optical axis O' and is reflected on the total reflection mirror 34 to be incident on the color separation prism P2. Object light incident on the color separation prism P2 is separated into object lights in three wavelength regions (e.g. central wavelengths 750 nm, 850 nm, 950 nm) of an infrared light region, and object light in the each wavelength region forms object images on image pickup surfaces of the infrared light image pickup elements 36A, 36B, 36C provided so as to meet the respective wavelength regions. Object images formed on the respective image pickup elements 36A, 36B, 36C are converted into electric signals and undergo various types of signal processing by the signal processing circuit mounted on the infrared light camera 20, and a video signal indicating an infrared video image of an object image is generated by the infrared camera 20.

The optical system is designed so that a view angle (focal length) of an image taken by the image pickup element 32 of the visible light camera 18 and an object distance thereof may almost meet view angles of respective images taken by the image pickup elements 36A, 36B, 36C of the infrared light camera 20 and an object distance.

In the video editor, when generating a key signal from an infrared video image, only one infrared video image obtained by the object light in a predetermined wavelength region is sufficient for formation of a key signal from an infrared video image, therefore only any one image pickup element designated by a user among the image pickup elements 36A, 36B, 36C may be effectively operated for image-taking to generate only a video signal of an infrared video image taken by the image pickup element with the infrared light camera 20.

Otherwise, all the image pickup elements 36A, 36B, 36C may be effectively operated for image-taking to generate a video signal of an infrared video image taken by the image pickup elements 36A, 36B, 36C with the infrared light camera 20 and to generate a key signal by selecting only the infrared video image designated by a user in the video editor.

Figure 3:
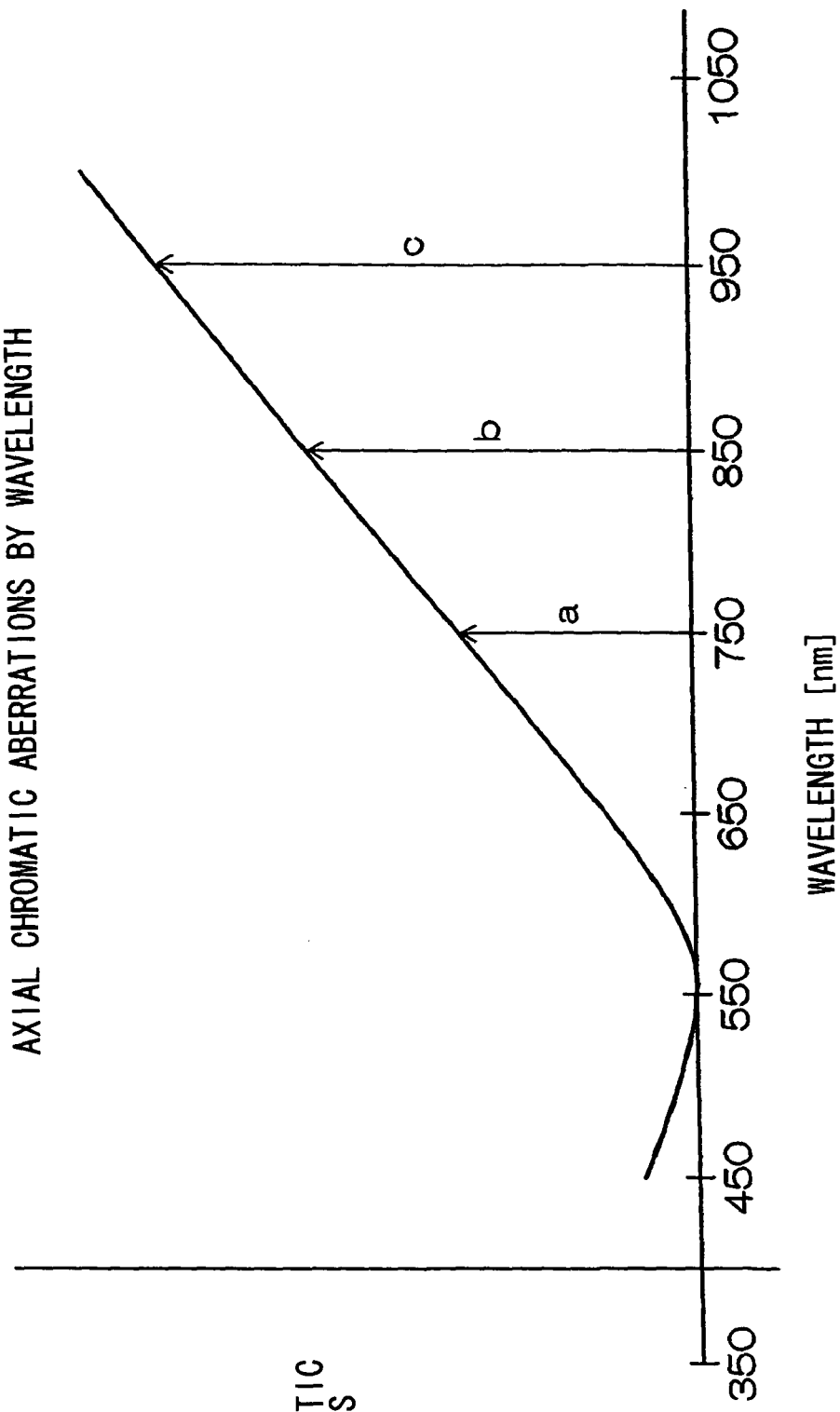
FIG. 3 is a view showing an example of axial chromatic aberrations.

Object lights incident on the respective image pickup elements 36A, 36B, 36C have different wavelength regions from each other, therefore image formation positions for the same object vary with axial chromatic aberrations. In an infrared optical system, for example, axial chromatic aberrations occur relative to respective wavelengths as shown in FIG. 3. At this time, as a wavelength is longer relative to an image formation position of object light of a wavelength (green) of approx. 550 nm, a distance to an image formation position of object light of each wavelength becomes longer. For example, in separating object light in an infrared light region into object lights in wavelength regions of central wavelengths 750 nm, 850 nm, 950 nm with the color separation prism P2 as described above, respective image pickup surfaces of respective image pickup elements 36A, 36B, 36C are arranged at intervals of "a", "b", "c" from an image formation position at which an image of object light in a wavelength region of approx. 550 nm is formed. This enables creation of video images at which any of the image pickup elements 36A, 36B, 36C is focused on the same object as the visible light image pickup element 32.

As described above, the visible and infrared light image-taking optical system according to the present invention can achieve an infrared video image by infrared lights in three wavelength regions within an infrared light region without need of physical switching operation, thus promptly and easily changing wavelength regions of infrared light used for image-taking according to image-taking conditions. By simply changing a wavelength of illumination light emergent from the illumination light sources 14, a wavelength region to be used for image-taking is changed. This enables infrared video images taken with infrared light in respective wavelength regions not to be affected by infrared light in any other wavelength region in an image-taking system of the embodiment described above. Accordingly, when performing image-taking using a plurality of TV cameras in the image-taking system, wavelength regions of infrared light used to take infrared video images with the respective TV cameras are made different from each other, thus removing an adverse effect of infrared light used as illumination light for another TV camera.

In addition to simultaneous image-taking with visible light and infrared light, simultaneous image-taking with each of infrared light separated into multiple wavelengths can be performed. In this case, if an object under illumination including infrared radiation or an object irradiating infrared radiation is a target to be taken, color video images or images of a plurality of wavelengths in infrared regions, which can be achieved by the optical system according to the present invention, will become useful information for image analysis including computer vision. For example, the following usage can be achieved: In retrieving a specific object from an image as image recognition technology, an approach is well known which learns features of an object to be retrieved in advance and makes a region having the most similar features applicable as an object, based on the learning results. However, this method will not provide complete accordance of the actual taken image with previously learned information by some reasons such as noises included during image pickup, image distortion cased by different image-taking conditions, shades caused by other objects or weather conditions. Accordingly, erroneous recognition may occur.

Besides use of the TV camera 10 as shown in FIGS. 1 and 2, an infrared LED (a red LED) is embedded in an object to be recognized, such as a wall or desk in an image-taking direction. This permits photographing with the red LED as a bright point for an infrared video image taken by the infrared light camera 20 of the TV camera 10, thus facilitating recognition of a target object by means of simple image processing. The red LED is an ultrasmall light-emitting device and emits no visible light, which enables the LED to be indistinctive on a color video image taken by the visible light camera 18.

Figure 4:
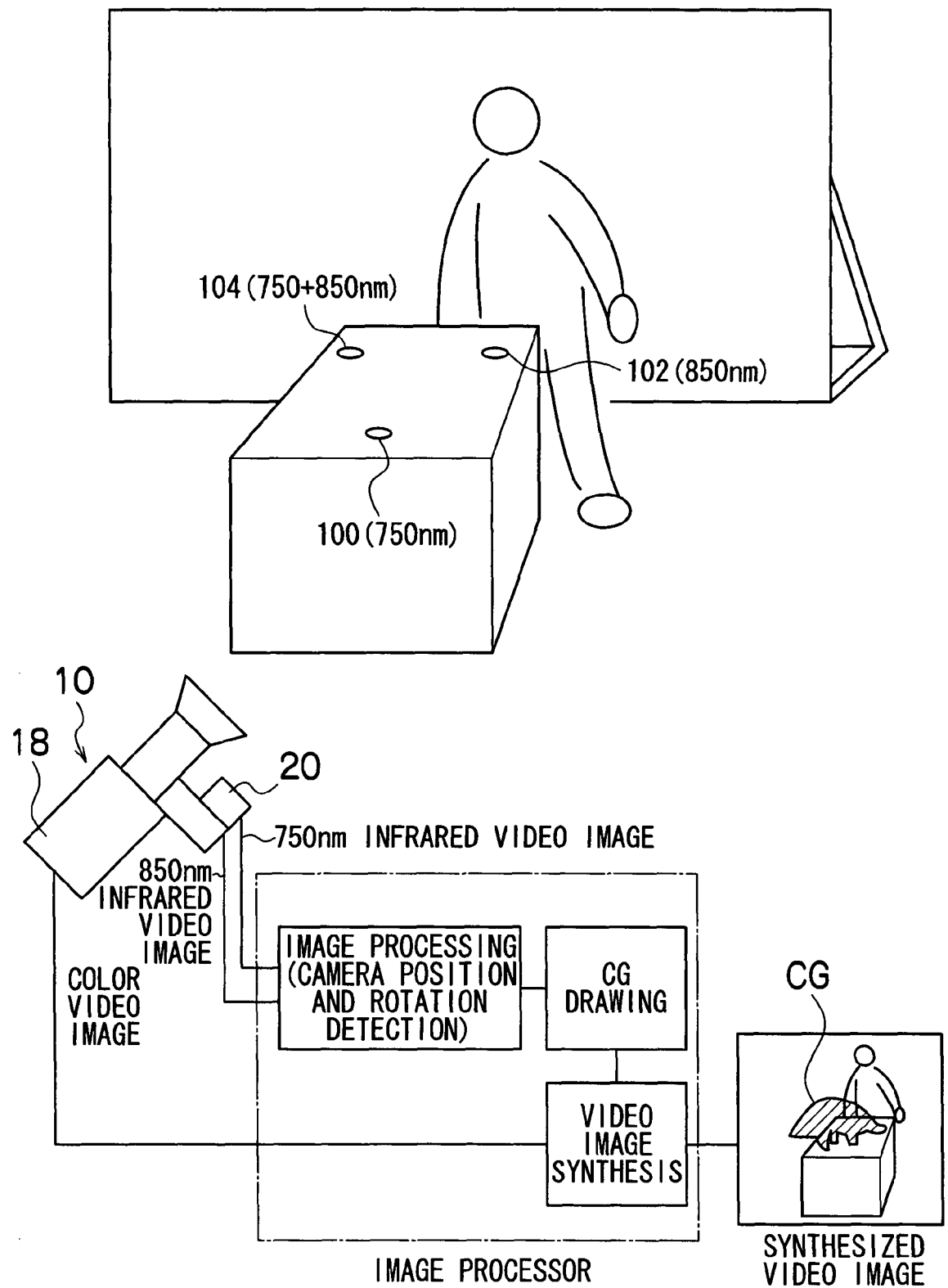
FIG. 4 is an explanatory view used for illustrating image-taking by use of TV camera shown in FIG. 1.

Moreover, analysis by image-taking and computer vision method using three or more red LEDs embedded in an object can calculate relative traveling positions and rotational amount of the TV camera 10 with respect to the infrared LEDs. Identification of the respective red LEDs can be expressed by unique infrared wavelengths or a combination thereof. For example, when image-taking the object as shown in FIG. 4 with the TV camera 10, the three infrared LEDs 100, 102, 104 are mounted on a table. At this time, for example, an LED which emits infrared light with a wavelength of 750 nm is used for the LED 100, an LED which emits infrared light with a wavelength of 850 nm is used for the LED 102, and an LED which emits infrared light with a combined wavelength of 750 nm and 850 nm is used for the LED 104.

This enables the infrared light camera 20 of the TV camera 10 to reflect the infrared LED 100, 102, 104 as bright points on an infrared video image taken by an image pickup element 36A for a wavelength region of 750 nm and an image pickup element 36B for a wavelength region of 850 nm. This application can materialize matched synthesis of a live action performed in a field of virtual reality or augmented reality or TV program production and camera work of CG (computer graphics).

For example, an infrared video image taken by the image pickup elements 36A and 36B in the infrared light camera 20 of the TV camera 10 as shown in FIG. 4 is fetched into an image processor for image processing. This permits detection of positions of the infrared LED 100, 102, 104 on infrared image to achieve information of the position and rotation of the TV camera 10 based on the information. On the basis of the information, CG taken with camera work meeting the TV camera 10 is drawn. On the other hand, a color video image taken by the visible light camera 18 of the TV camera 10 is fetched into the image processor to synthesize the color video image and the CG video image. This enables matched synthesis of a live action and CG camera work.

As described above, in the above embodiments, object light in an infrared light region is separated into object lights in three wavelength regions by the color separation prism P2, however, the object light may be separated into object lights in only two, or four or more wavelength regions, not limited to three regions. Moreover, object light in an infrared light region may be separated into object lights in a plurality of wavelength region by another means such as a dichroic mirror, in place of the color separation prism P2.

In addition, in the above embodiments, the whole or a part of the optical system (the color separation prism P2 and image pickup elements 36A, 36B, 36C) of the infrared light camera 20 may be incorporated into a camera cone of the image-taking lens 16 as an optical system of the image-taking lens 16.

Furthermore, in the above embodiments, the illumination light sources 14 of infrared light in FIG. 1 may be structured so as to irradiate infrared light only in a wavelength region used for image-taking, or so as to irradiate infrared light in regions including the whole wavelength region operable by the infrared light camera 20.

What is claimed is:

1. A visible and infrared light image-taking optical system comprising:
   a first color separation optical system for separating object light incident on an image-taking optical system into object light in a visible light region and object light in an infrared light region;
   a visible light optical system for forming an object image on an image pickup surface of a visible light image-taking device which performs imaging with object light in a visible light region separated by the first color separation optical system; and
   an infrared light optical system for forming an object image on an image pickup surface of an infrared light image-taking device which performs imaging with object light in an infrared light region separated by the first color separation optical system, wherein
   the infrared light optical system includes a second color separation optical system different from the first color separation optical system and optically coupled to the first color separation optical system, the second color separation optical system decomposing the object light in an infrared light region received from said first color separation optical system into object lights in a plurality of different infrared wavelength regions and the infrared light image-taking device includes a plurality of image pickup elements for taking an object image formed by each object light for each object light in each infrared wavelength region decomposed by the second color separation optical system, and
   said second color separation optical system of the infrared light optical system includes dichroic filters reflecting only object light in part of wavelength regions in the infrared light region and transmitting object light in other wavelength regions in the infrared light region so as to decompose the object light in the infrared region into object lights in a plurality of different infrared wavelength regions.

2. The visible and infrared light image-taking optical system according to claim 1, wherein
   each of image pickup surfaces of the plurality of image pickup elements is disposed at a respective image formation position that reduces axial chromatic aberrations and wherein each of the respective image formation positions corresponds to a different center wavelength of object light that forms an object image on the image pickup surface of the corresponding image pickup element.

3. The visible and infrared light image-taking optical system according to claim 1, wherein the plurality of different infrared wavelength regions in the infrared light region have center wavelengths around 750 nm, 850 nm and 950 nm.

4. The visible and infrared light image taking optical system according to claim 1, further comprising:
   a third color separation optical system optically coupled to the first color separation optical system, the third color separation optical system for separating the object light in a visible region from the first color separation optical system into object lights in wave length regions of respective colors R, G, and B.

5. The visible and, infrared light image-taking optical system according to claim 1, wherein there are more than two different wavelength regions in the plurality of different infrared wavelength regions.

* * * * *